(12) United States Patent
Baur et al.

(10) Patent No.: US 9,180,534 B2
(45) Date of Patent: Nov. 10, 2015

(54) DOUBLE TRIMMING SHEARS

(75) Inventors: Thomas Baur, Hilchenbach (DE);
Andreas Bohn, Hilchenbach (DE);
Ulrich Meinhardt, Hilchenbach (DE)

(73) Assignee: SMS group GMBH, Düsseldorf (DE)

( * ) Notice: Subject to any disclaimer, the term of this patent is extended or adjusted under 35 U.S.C. 154(b) by 0 days.

(21) Appl. No.: 13/519,074

(22) PCT Filed: Dec. 6, 2010

(86) PCT No.: PCT/EP2010/068935
§ 371 (c)(1),
(2), (4) Date: Oct. 23, 2012

(87) PCT Pub. No.: WO2011/076548
PCT Pub. Date: Jun. 30, 2011

(65) Prior Publication Data
US 2013/0042737 A1 Feb. 21, 2013

(30) Foreign Application Priority Data

Dec. 23, 2009 (DE) .......................... 10 2009 060 253

(51) Int. Cl.
*B23D 35/00* (2006.01)
*B23D 15/08* (2006.01)
(52) U.S. Cl.
CPC .............. *B23D 35/005* (2013.01); *B23D 15/08* (2013.01); *Y10T 83/8843* (2015.04)
(58) Field of Classification Search
CPC  Y10T 83/8841; Y10T 83/8843; B23D 35/00; B23D 35/005; B23D 15/08
USPC ............................ 83/628, 622, 640, 632, 530
See application file for complete search history.

(56) References Cited

U.S. PATENT DOCUMENTS

| | | | | | |
|---|---|---|---|---|---|
| 139,146 | A | * | 5/1873 | Harrington | 83/640 |
| 236,613 | A | * | 1/1881 | Nelson | 83/516 |
| 2,098,159 | A | * | 11/1937 | Peiseler | 83/679 |
| 2,193,148 | A | * | 3/1940 | Thomas | 83/641 |
| 2,303,760 | A | * | 12/1942 | Rafter | 83/530 |
| 2,707,996 | A | * | 5/1955 | Kalb | 83/628 |
| 3,246,552 | A | * | 4/1966 | Sieger | 83/215 |
| 3,262,346 | A | * | 7/1966 | Spohn | 82/137 |
| 3,616,719 | A | * | 11/1971 | Tassie | 83/210 |
| 3,768,360 | A | * | 10/1973 | Heyne | 83/623 |
| 4,463,642 | A | * | 8/1984 | Minato et al. | 83/530 |
| 4,476,760 | A | * | 10/1984 | Block et al. | 83/582 |

(Continued)

FOREIGN PATENT DOCUMENTS

| | | |
|---|---|---|
| DE | 474248 | 3/1929 |
| DE | 1427164 | 3/1969 |

(Continued)

*Primary Examiner* — Sean Michalski
(74) *Attorney, Agent, or Firm* — Lucas & Mercanti, LLP; Klaus P. Stoffel

(57) ABSTRACT

The invention relates to double trimming shears having a stationary bottom knife and a driven top knife which can be raised and lowered, wherein the top knife is arranged on a top knife carriage (12) guided by means of a carriage guide (10), wherein a first eccentric shaft (14) and a second eccentric shaft (16) on the carriage guide (10) is provided in order to guide the carriage guide (10) if an inclined position of the top knife carriage is to be prevented. This is achieved in that the first eccentric shaft (14) and the second eccentric shaft (16) are interconnected via a synchronization means (18).

3 Claims, 2 Drawing Sheets

(56) References Cited

U.S. PATENT DOCUMENTS

| | | | |
|---|---|---|---|
| 4,763,551 A * | 8/1988 | Halff et al. | 83/277 |
| 4,923,571 A * | 5/1990 | Kronseder | 198/454 |
| 4,991,480 A * | 2/1991 | Fritsch | 83/620 |
| 5,237,901 A * | 8/1993 | Warga, III | 83/583 |
| 5,669,279 A * | 9/1997 | Sohl et al. | 83/425.2 |
| 5,823,087 A * | 10/1998 | Eigenmann | 83/630 |
| 5,924,351 A * | 7/1999 | Kovatch | 83/699.41 |
| 6,067,886 A * | 5/2000 | Irwin | 83/615 |
| 6,178,857 B1 * | 1/2001 | Marocco | 83/52 |
| 6,715,981 B1 * | 4/2004 | Harsch et al. | 414/752.1 |
| 6,722,245 B2 * | 4/2004 | Yasoda et al. | 83/639.1 |
| 6,758,120 B2 * | 7/2004 | Marocco | 83/52 |
| 7,004,006 B2 * | 2/2006 | Nagae | 72/450 |

FOREIGN PATENT DOCUMENTS

| | | |
|---|---|---|
| DE | 3219539 | 1/1983 |
| DE | 3515837 | 11/1985 |
| EP | 0196422 | 10/1986 |
| FR | 1475574 Y | 3/1967 |
| GB | 929917 | 6/1963 |
| JP | 51142788 | 12/1976 |
| JP | 61201725 Y | 9/1986 |
| RU | 80663 U1 | 2/2009 |
| RU | 86127 U1 | 8/2009 |
| WO | WO 2013136952 A1 * | 9/2013 |

* cited by examiner

//DOUBLE TRIMMING SHEARS

The present application is a 371 of International application PCT/EP2010/068935, filed Dec. 6, 2010, which claims priority of DE 10 2009 060 253.4, filed Dec. 23, 2009, the priority of these applications is hereby claimed and these applications are incorporated herein by reference.

BACKGROUND OF THE INVENTION

The invention pertains to a double trimming shears, with a stationary lower knife and a lowerable and raisable driven upper knife, wherein the upper knife is mounted on an upper-knife carriage, which is guided by a carriage guide, wherein, for the guidance of the carriage guide, a first eccentric shaft and a second eccentric shaft are provided on the carriage guide.

Double trimming shears are usually used to trim sheets of metal to their final width. Double trimming shears are usually driven by crank drives, but the cutting movement of these drives cannot be adjusted. The carriage guide of the upper-knife carriage is attached to an eccentric shaft in the upper area and to a second eccentric shaft in the lower area. In the lower area, the eccentric shaft is usually supported by a connecting rod. The height of the guide of the upper-knife carriage can be adjusted by means of the eccentric shaft provided in the upper area. The coupling of the eccentric shaft in the lower area by means of a connecting rod results in a horizontal displacement of the carriage guide. In cases where the carriage guide of the upper-knife carriage is adjusted in the lower area by means of a connecting rod in a manner separate from the upper area, the upper-knife carriage can experience undesirable tilting.

SUMMARY OF THE INVENTION

The invention is therefore based on the goal of providing a double trimming shears in which the tilting of the upper-knife carriage can be prevented.

The inventive double trimming shears comprises a stationary lower knife and a lowerable and raisable driven upper knife, wherein the upper knife is mounted on an upper-knife carriage, which is guided by a carriage guide, wherein, for the guidance of the carriage guide, a first eccentric shaft and a second eccentric shaft are provided on the carriage guide. The invention is characterized in that the first eccentric shaft and the second eccentric shaft are connected to each other by a synchronization means.

Because, according to the invention, a connecting rod is no longer provided on one of the eccentric shafts and instead the eccentric shafts are now connected to each other by a synchronization means, so that these shafts (can) execute movement in synchrony with each other, it is ensured that the upper-knife carriage, i.e., the carriage guide of the upper-knife carriage, will be shifted transversely or horizontally in a parallel manner, which makes it possible to adjust the gap between the knives suitably for trimming the sheet metal. The upper-knife carriage, i.e., the carriage guide, is thus prevented from tilting.

According to an advantageous embodiment of the invention, the synchronization means is designed as a rigid rod. Because the synchronization means is designed as a rigid, inflexible rod, the first and second eccentric shafts can be guided or shifted in such a way that they remain exactly parallel to each other, where simultaneously the rigid synchronization means distributes the pressure exerted on the two eccentric shafts uniformly over the two shafts.

If is also preferably provided that the synchronization means is supported rotatably on the first eccentric shaft and rotatably on the second eccentric shaft. Because of the rotational support of the synchronization means on the two eccentric shafts, the synchronization means can follow the movements of the eccentric shafts, effectively synchronize them with each other, and transmit the movement of the one eccentric shaft to the other shaft.

The first eccentric shaft is preferably mounted on a first end of the carriage guide, and the second eccentric shaft is preferably mounted on the second end of the carriage guide, i.e., the end opposite the first end. The first eccentric shaft is preferably mounted on the end coming first in the cutting direction of the upper knife, the second end preferably on the end coming second. Because an eccentric shaft is provided at each end, it is possible to guide the movement of the carriage guide, i.e., of the upper knife, uniformly along the cutting direction, as a result of which an especially optimized parallel displacement of the carriage guide, transversely or horizontally, along the cutting direction can be achieved. As a result, it is possible improve the quality of the cut by the vertical guidance and alignment of the upper-knife carriage over the entire area in which the knife gap can be adjusted.

The first eccentric shaft and the second eccentric shaft, furthermore, are advantageously arranged along the carriage guide one behind the other in the cutting direction of the upper knife, with an offset from each other. Because the first eccentric shaft and the second eccentric shaft are arranged one behind the other in the carriage guide in the cutting direction of the upper knife with an offset to each other, it is possible to achieve optimal adjustment of the carriage guide. Possible tilts can thus be compensated more effectively. "Offset" from each other means here that the first and the second eccentric shafts are arranged on the carriage guide in such a way that the distance between the first eccentric shaft and the upper-knife carriage is preferably shorter than the distance between the second eccentric shaft and the upper-knife carriage.

The invention also pertains to a shearing line comprising a double trimming shears designed and elaborated as described above.

BRIEF DESCRIPTION OF THE DRAWING

The invention is explained in greater detail below on the basis of a preferred embodiment by reference to the attached drawings.

DETAILED DESCRIPTION OF THE INVENTION

Figure 1:
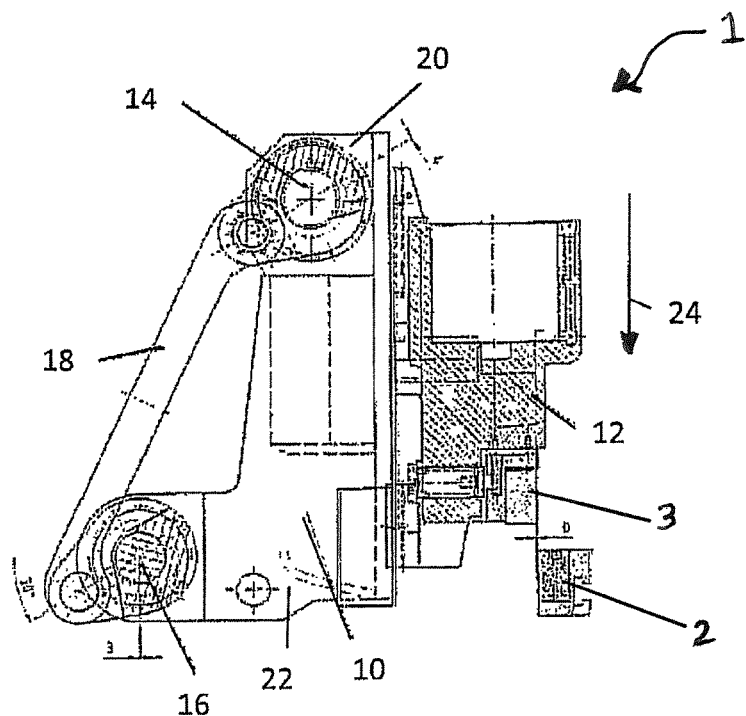
FIG. 1 shows a cross-sectional schematic diagram of an inventive double trimming shears in a first position.
Figure 2:
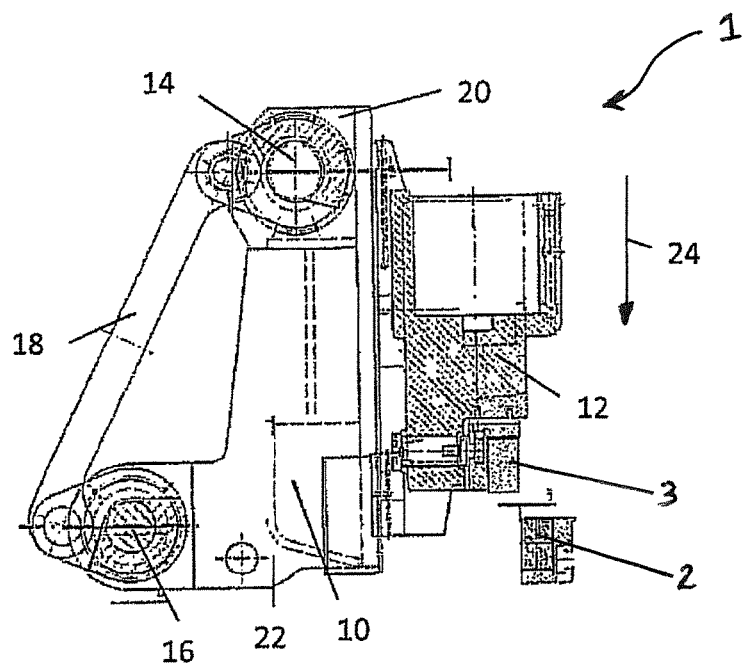
FIG. 2 shows a cross-sectional schematic diagram of the inventive double trimming shears in a second position.
Figure 3:
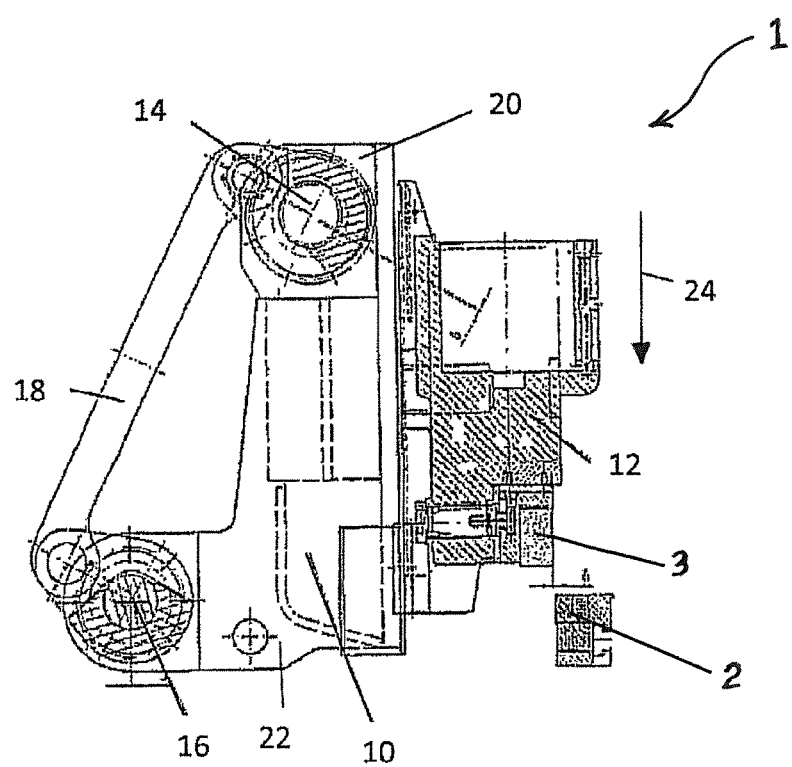
FIG. 3 shows a cross-sectional schematic diagram of the inventive double trimming shears in third position.

FIGS. 1-3 show an inventive double trimming shears 1 in various positions. The double trimming shears comprises a stationary lower knife 2 and a driven upper knife 3, which can be raised and lowered, where the upper knife is mounted on an upper-knife carriage 12, guided by a carriage guide 10. To guide the carriage guide 10, a first eccentric shaft 14 and a second eccentric shaft 16 are provided on the carriage guide 10, wherein the first eccentric shaft 14 and the second eccentric shaft 16 are connected to each other by a synchronization means 18. As a result, the first eccentric shaft 14 and the second eccentric shaft 16 can execute movement in synchrony with each other and thus bring about the parallel displacement of the upper-knife carriage 12 in the horizontal or transverse direction to adjust the knife gap, especially the knife gap of the upper knife.

The synchronization means 18 is designed as a rigid rod, which is supported rotatably on the first eccentric shaft 14 and on the second eccentric shaft 16, which can be seen in FIGS. 1-3 on the basis of the different rotational positions of the eccentric shafts 14, 16 and of the synchronization means 18 shown there.

The first eccentric shaft 14 is mounted on a first end 20 of the carriage guide 10, and the second eccentric shaft 16 is mounted on the second end 22 of the carriage guide 10, i.e., the end opposite the first end 20. The first eccentric shaft 14 and the second eccentric shaft 16 are arranged one behind the other on the carriage guide 10 in the cutting direction 24 of the upper knife and with an offset to each other, wherein the distance between the first eccentric shaft 14 and the upper-knife carriage 12 in the transverse or horizontal direction is smaller than the distance between the second eccentric shaft 16 and the upper-knife carriage 12 in the transverse or horizontal direction.

The invention claimed is:

1. A blade gap adjustment system for double trimming shears having: a stationary lower knife, an upper knife lowerable and raisable along a vertical axis in a vertical cutting direction (24), a carriage guide (10) extending in a direction of the vertical axis, an upper-knife carriage (12) guided by the carriage guide (10), the upper knife being mounted on the upper knife carriage, the blade gap adjustment system comprising: a first eccentric shaft (14) provided on the carriage guide (10), wherein
the first eccentric shaft (14) is mounted on an upper end (20) of the carriage guide (10) along the vertical axis;
a second eccentric shaft (16) mounted on a lower end (22) of the carriage guide (10) along the vertical axis; and
synchronization means (18) for connecting the first eccentric shaft (14) and the second eccentric shaft (16) to each other and for rotating the first and second eccentric shafts to displace the upper knife carriage in a direction transverse to the vertical axis to adjust a knife gap between the upper knife and the lower knife, the synchronization means (18) transmitting movement from one of the eccentric shafts to another of the eccentric shafts to effectively synchronize the first and second eccentric shafts (14, 16), the synchronization means being a rigid, inflexible rod which is supported rotatably on the first eccentric shaft (14) and rotatably on the second eccentric shaft (16).

2. A blade gap adjustment system according to claim 1, wherein the first eccentric shaft (14) and the second eccentric shaft (16) are offset to each other in the transverse direction so that a distance of the first eccentric shaft from the upper knife carriage is shorter than a distance of the second eccentric shaft from the upper knife carriage.

3. A shearing line, comprising: a double trimming shears; and a blade gap position adjustment system according to claim 1.

* * * * *